US012792322B2

(12) United States Patent
Tronicek

(10) Patent No.: US 12,792,322 B2
(45) Date of Patent: Nov. 10, 2026

(54) SYSTEM AND METHOD FOR INDEXING SOURCE CODE

(71) Applicant: The Research Foundation for the State University of New York, Albany, NY (US)

(72) Inventor: Zdenek Tronicek, Oneonta, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 306 days.

(21) Appl. No.: 18/440,360

(22) Filed: Feb. 13, 2024

(65) Prior Publication Data

US 2024/0184549 A1 Jun. 6, 2024

Related U.S. Application Data

(63) Continuation-in-part of application No. 17/668,115, filed on Feb. 9, 2022, now abandoned.

(51) Int. Cl.
*G06F 8/41* (2018.01)
*G06F 16/22* (2019.01)

(52) U.S. Cl.
CPC .......... *G06F 8/427* (2013.01); *G06F 16/2246* (2019.01)

(58) Field of Classification Search
None
See application file for complete search history.

(56) References Cited

U.S. PATENT DOCUMENTS

| | | | | |
|---|---|---|---|---|
| 8,819,856 | B1 * | 8/2014 | Tiffe | G06F 21/125 726/31 |
| 11,675,584 | B1 * | 6/2023 | Sengupta | G06F 8/75 717/124 |
| 2022/0374208 | A1 * | 11/2022 | Allamanis | G06F 8/33 |

OTHER PUBLICATIONS

R. Koschke, "Clone Detection Using Abstract Syntax Suffix Trees," 2006 13th Conference on Reverse Engineering, Benevento, Italy, 2006, pp. 253-262 (Year: 2006).*

M. Chilowicz, E. Duris and G. Roussel, "Syntax tree fingerprinting for source code similarity detection," 2009 IEEE 17th International Conference on Program Comprehension, Vancouver, BC, Canada, 2009, pp. 243-247. (Year: 2009).*

J. Zhang, X. Wang, H. Zhang, H. Sun, K. Wang and X. Liu, "A Novel Neural Source Code Representation Based on Abstract Syntax Tree," 2019 IEEE/ACM 41st International Conference on Software Engineering (ICSE), Montreal, QC, Canada, 2019, pp. 783-794. (Year: 2019).*

* cited by examiner

*Primary Examiner* — Andrew M. Lyons
(74) *Attorney, Agent, or Firm* — Garrett M. Smith

(57) ABSTRACT

A system and computer-implemented method of indexing source code where the source code is processed into abstract syntax trees, the abstract syntax trees are linearized, and the linearizations are used to build an index structure. The index structure enables the look up of the pattern tree in time linear in its length. Further, the index structure can be used to identify code clones. Two alternate variants of the index structure can be used. One is based on a trie which builds a plain index structure, and the other index structure is based on a compressed trie which builds a compressed index structure.

20 Claims, 5 Drawing Sheets

SYSTEM AND METHOD FOR INDEXING SOURCE CODE

CROSS-REFERENCE TO RELATED APPLICATION

This application is a continuation-in-part of U.S. patent application Ser. No. 17/668,115, filed on Feb. 9, 2022, the entirely of which is hereby incorporated herein by this reference.

BACKGROUND OF THE INVENTION

1. Field of the Invention

The present invention generally relates to computer systems. More particularly, the present invention relates to systems and computer-implemented methods for managing and interacting with source code.

2. Description of the Related Art

The problem of tree pattern matching in abstract syntax trees (ASTs) commonly arises in a code recommendation system when it searches for code fragments and in an "Integrated Development Environment" (IDE) when performing operations on source code. The motivation to specifically investigate source code clones arises from performing common software engineering tasks, such as development, maintenance, and bug fixing. For example, when a programmer writes a function, they may appreciate the information that the function already exists in the same code base, and when the programmer enhances a code fragment, they may want to know about any and all duplicates of that fragment.

There are extant methods for source code clone detection can generally be divided into methods based on: textual representation: tokens; ASTs; and metrics. With respect to ASTs, the extant methods for indexing ASTs are usually based on the use of a "suffix tree."

A suffix tree is a tree data structure that contains all suffices of a text and that can be represented in linear space. The "trie," also known as the prefix tree, is built of independent strings (they are not required to be suffixes of some string). The compressed trie (also called the compact trie), is a trie with edges labeled by strings instead of single characters. One can get a compressed trie from a plain trie by compressing the edges.

Accordingly, it is to address this problem in creating indexing structures for source code to assist in software engineering and maintenance tasks that the present invention is primarily directed to.

BRIEF SUMMARY OF THE INVENTION

Briefly described, the present invention is a system, computer-implemented method, and a non-transitory computer readable medium having instructions that allow the indexing of source code. In the system, one or more processors that are configured to process source code into index structures through the steps of obtaining source code, and building an index structure. Building the index structure occurs by parsing the source code to generate one or more abstract syntax trees (ASTs), linearizing subtrees of the ASTs, with each subtree having one or more elements thereof, and building a trie from the linearized subtrees, wherein the trie is comprised of a plurality of nodes and one or more edges. The method continues by adding one or more positions of elements of the subtrees within the source code to edges and nodes of the trie, with the one or more positions associated with one or more edges, one or more of the plurality of nodes, or both one or more edges and one or more the plurality of nodes of the trie.

The index structure can be comprised of the trie, or can be compressed. Further, the trie can be compressed and the index structure based on the compressed trie.

Additionally, the system and method can include the step of building an index structure by including one or more code bases. With the code bases, the step can be performed of detecting code clones in the one or more code bases, and can also include searching for a code fragment in the one or more code bases.

The system, computer-implemented method, and computer readable medium described herein are an improvement over existing methods for at least two reasons: The index structure described herein linearizes ASTs in a manner which results in more precise results; and the linearizations of ASTs are arranged in a trie or compressed trie, which results in the index that can be easily modified to reflect the changes in source code, thus providing significantly better results (in terms of precision and recall) when it is used to detect code clones.

In the case of the index structure based on the suffix tree, the index structure is rebuilt after each change. The possibility to modify the index after each change in source code makes the index suitable for reporting code clones "online" (after each change in source code) in IDE. The method described herein can use a trie and compressed trie.

Therefore, the present invention provides an advantage in the efficient and automated creation of index structures for source code to look for source code clones and fragments. The present invention is also industrially applicable as it provides a computer system and computer-readable medium that allows automated refinement and interaction with source code for more efficient software creation, maintenance, and upgrade. It is to these and other benefits and advantages that the present invention is directed.

DETAILED DESCRIPTION OF THE INVENTION

With reference to the figures in which like numerals represent like elements throughout the several views, this disclosure describes techniques for source-code indexing. The described techniques create an index of source code that can be used, for example, to find a fragment of code in a large code base or to detect the same or similar code fragments in a large code base. Upon a change in the code base, the index can be modified so that it reflects that change.

Figure 1A:
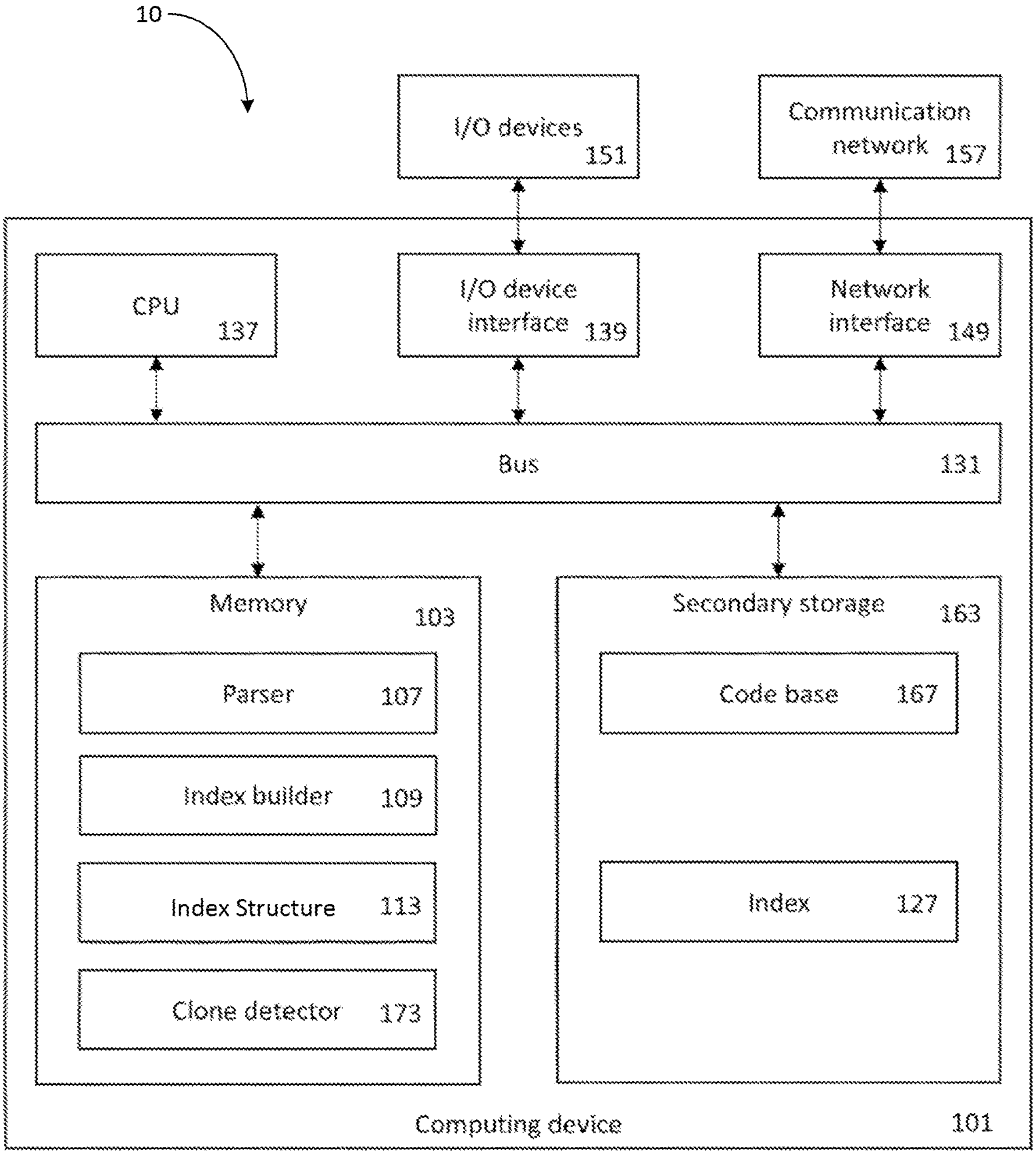
FIG. 1A is a block diagram of one embodiment of a system to index source code.
Figure 1B:
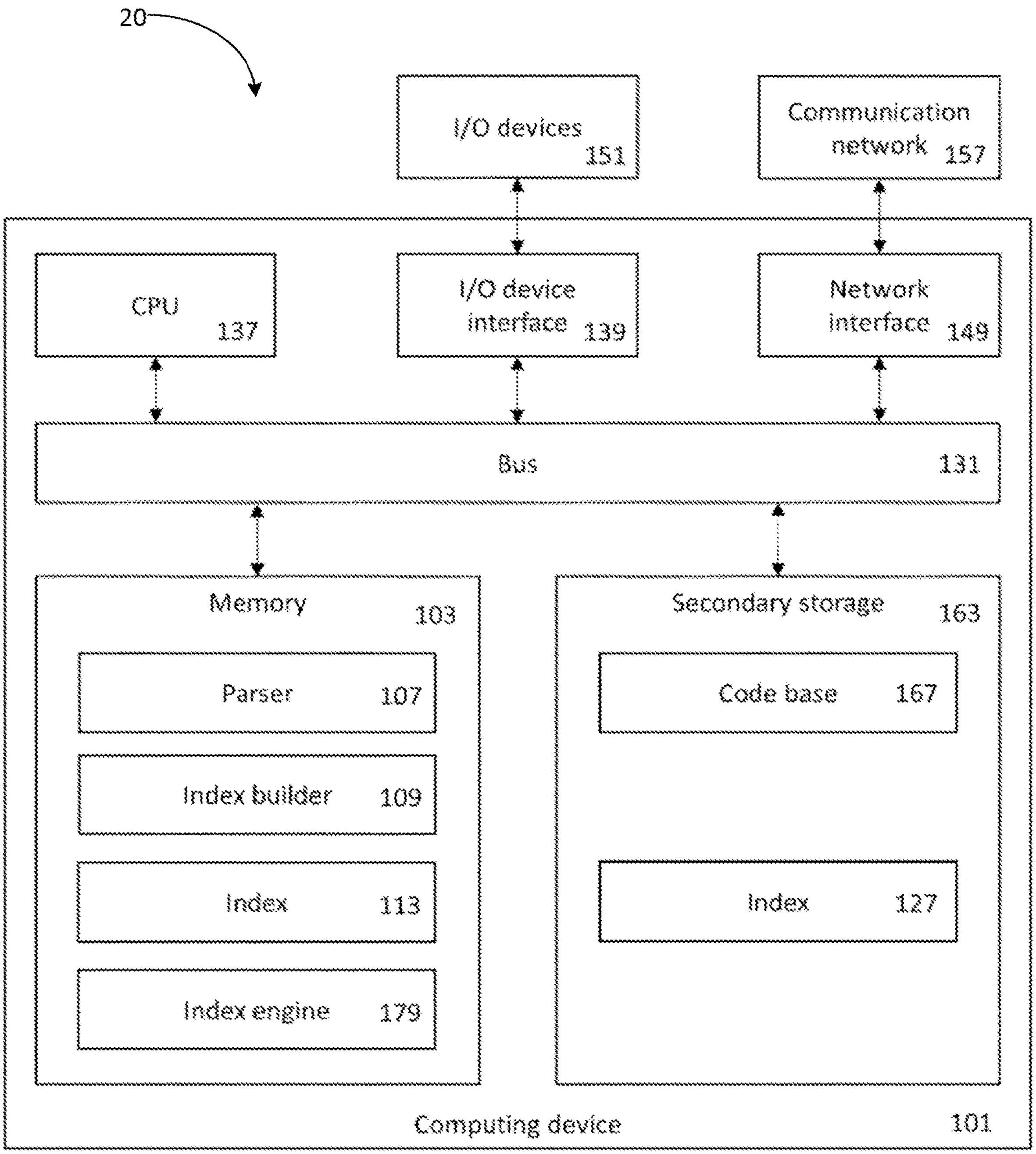
FIG. 1B is a block diagram of an alternate system for indexing source code.

FIGS. 1A and 1B illustrate an example of computer architecture that implements the described techniques for source-code indexing and clone detection. These figures share some components, which are described here just once. The computer architecture may include a computing device 101, which may be a part of a distributed system and may communicate with other computing devices via a network interface 149 and communication network 157. The communication network 157 represents any one or combination of multiple different types of networks interconnected with each other and functioning as a single network, such as the Internet. It may involve wire-based networks and wireless networks. The computing device may be operated by a user via input/output devices 151, such as a keyboard, mouse and monitor, which may be connected to input/output device interface 139.

The computing device 101 may include one or more processors 137, memory 103 and secondary storage 163. A processor executes instructions stored in memory 103 or on secondary storage 163 and stores and retrieves data residing in memory 103 or on secondary storage 163. The bus 131 is used for communication between the processor 137, I/O device interface 139, network interface 149, memory 103 and secondary storage 163. The memory 103 may contain parser 107, the index builder 109 and the index structure 113. The secondary storage 163 may contain the code base 167 and the index structure 127. The index structure 113 is depicted twice, in memory and on secondary storage, but it may be present only in memory or only on secondary storage or partially in memory and partially on secondary storage. The parser parses the code base 167 and builds its structural representation, such as abstract syntax trees (ASTs) or concrete syntax trees (CSTs). The code base 167 is a collection of source code of programming projects. The parser may be a stand-alone program or it may be a part of another program, such as a compiler, or any combination of programs. The index builder 109 linearizes the structural representation built by the parser and builds the index structure 113.

In FIG. 1A, the clone detector 173 uses the index structure 113 to detect code clones. In FIG. 1B, the index engine 179 uses the index structure 113 to find occurrences of a code fragment (query) in the code base 167. It uses parser 107 to convert a code fragment to its structural representation, such as ASTs, then it linearizes that structural representation, and finally it finds occurrences of the linearization in the index structure 113.

In one embodiment, the system 10 includes one or more processors (computing device 101) that are configured to process source code into an index structure 113 through the steps of obtaining source code, and building an index structure 113. Building the index structure 113 occurs by parsing the source code (parser 107) to generate one or more abstract syntax trees (ASTs), such as trie 400 in FIG. 4, linearizing subtrees of the ASTs, with each subtree having one or more elements thereof, and building a trie from the linearized subtrees, wherein the trie is comprised of a plurality of nodes and one or more edges (edge 404, FIG. 4). The method continues by adding one or more positions of elements of the subtrees within the source code to edges 404 and nodes 402 of the trie 400, with the one or more positions associated with one or more edges 404, one or more of the plurality of nodes 402, or both one or more edges 404 and one or more the plurality of nodes 402 of the trie 400.

Figure 4:
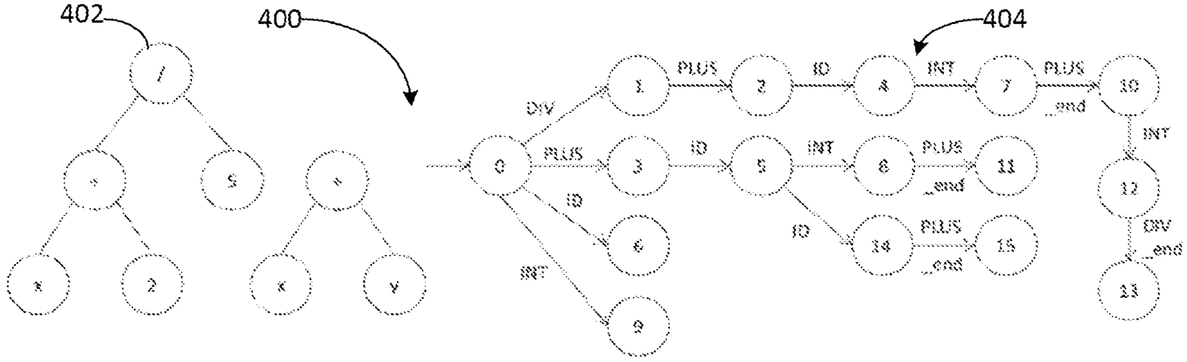
FIG. 4 shows the abstract syntax trees of expressions (x+2)/5 and x+y and one possible corresponding plain trie. The index structure consists of the trie and the positions associated with edges and/or nodes.

The index structure can be comprised of the trie, e.g. trie 400 in FIG. 4, or can be compressed. Further, the trie 500 (FIG. 5) can be compressed and the index structure 113 based on the compressed trie 500. It should be noted that although the trie 400, compressed trie 500, and suffix tree are similar data structures, they are not the same.

Additionally, the system 10 and method can include the step of building an index structure 113 by including one or more code bases 167. With the code bases 167, the step can be performed of detecting code clones (step 233, FIG. 2) in the one or more code bases 167, and can also include searching for a code fragment (FIG. 3) in the one or more code bases 167.

The index structure 113 is described here for the Java programming language; however, the concept is applicable to any programming language. Java code is structured into packages, classes, and methods, which is the terminology used in this text. For procedural languages, we would substitute "function" for "method". The index structure is here referred to as the index, but it is not a common index because it does not find patterns that span two syntactic units. For example, it does not find a fragment of code that begins in one statement and ends in another statement, or a fragment of code that begins in one method and ends in another method.

The index structure 113 can be full or simplified and either of them can use either the trie 400 or the compressed trie 500. The trie 400 and the compressed trie 500 (sometimes called compact trie or radix tree) are fundamental data structures, which are well described in literature. The difference between them is that the edges 404 of the trie 400 are labeled by symbols and the edges of compressed trie 500 are labeled by sequences of symbols. Whenever it is appropriate to emphasize that the trie 400 is not compressed, it is referred to as the plain trie. The index structure consists of the plain trie or compressed trie and positions associated with edges or with nodes or with edges and nodes. These positions refer to the code base.

The full index can be built in two steps: 1. Parse source code and build structural representation of methods. 2. Linearize subtrees of the structural representation and build a trie (plain or compressed) that accepts all these linearizations, and add positions of these subtrees in the code base to edges or to nodes or to edges and nodes of the trie.

The simplified index can also be built in two steps: 1. Parse source code (Parser 107) and build structural representation of syntactic units, such as methods and statements. 2. Linearize the structural representation of each syntactic unit (step 227) and build a trie (plain or compressed) that accepts all these linearizations, and add positions of these subtrees in the code base to edges or to nodes or to edges and nodes of the trie. The linearization captures the structure of the structural representation, such as AST or CST. For example, in the case of AST it may be done as follows: we concatenate node representations and special symbols, which are added at the end of each subtree (except for subtrees that are of a single node that cannot have children). When linearizing ASTs, we may consider all literals equal and may rename identifiers or consider all identifiers equal so that the index depends rather on the code structure than on concrete values of literals and concrete identifiers.

For example, when one linearizes the subtrees of ASTs in FIG. 4, we may get the following linearizations for the first trie 400 (PLUS_end and DIV_end are special symbols at the end of the tree):

DIV, PLUS, ID, INT, PLUS_end, INT, DIV_end (the whole tree),

PLUS, ID, INT, PLUS_end (the subtree rooted at node "+"),

ID (the subtree rooted at node x),

INT (the subtrees rooted at nodes 2 and 5).

And the following linearizations for the second tree:

PLUS, ID, ID, PLUS_end (the whole tree),

ID (the subtrees rooted at nodes x and y).

The symbols used in this example, such as DIV and PLUS, are only for illustrative purposes and the embodiment may use different symbols. The order of symbols is also only for illustrative purposes and the embodiment may use a different order. The special symbols may also be added in other cases than at the end of each subtree, such as when a node refers to a list of subtrees. For example, to distinguish between "class C extends Object" and "class C implements Serializable", one may add a mark at the beginning and at the end of the list of implemented interfaces. When analyzing a statically typed language, we may add information about the types of variables, which enables us to distinguish between two trees with the same structure but different types.

For example, if variable x in FIG. 4 is of type int, the linearization of the first tree may be DIV, PLUS, ID:INT, INT, PLUS_end, INT, DIV_end, where ID:INT represents a variable of type int. The symbols used in this example, such as DIV and PLUS, are only for illustrative purposes and the embodiment may use different symbols. The order of symbols is also only for illustrative purposes and the embodiment may use a different order.

Another potential linearization of the structural representation is to concatenate representations of corresponding lexical symbols (i.e., symbols of lexical analyzer). Since the structural representation is not needed in this case, parsing can be simplified to recognizing the boundary of syntactic units. The descriptions of possible linearizations above are presented only for illustrative purposes. They are not intended to be exhaustive and they do not limit possible embodiments of this disclosure. Many modifications and variations of possible linearizations will be apparent to those who have ordinary skills in the art.

The index structure 113 can be used to report code clones. A clone is a code fragment that is duplicated somewhere else in the same code base or in another code base. We usually divide clones into four categories: 1. Type 1 (exact clone) is the exact copy of the code fragment. There can be changes only in white spaces and comments. 2. Type 2 (renamed clone) is a syntactically identical copy and it appears for example when we copy a code fragment, modify literals and change ("rename") identifiers of types, variables and methods in that fragment. As in Type 1, changes in white spaces and comments are allowed. A subset of renamed clones is parameterized clones, which are syntactically identical code fragments with modified literals and systematically renamed identifiers of types, variables and methods. 3. Type 3 (near-miss clone) is a "renamed" code fragment with some structural modifications. For example, some statements are modified, added, or removed. 4. Type 4 (semantic clone) is a code fragment that is semantically equivalent to the original code fragment, but syntactically may be different. For example, when we replace an algorithm with another one that gives the same results, the two code fragments are functionally equivalent, but they are syntactically different.

The index structure can be used to find Type-1 and Type-2 clones as follows: we traverse the trie and report the linearizations that are associated with more than one position in source code. The following algorithm illustrates how the index can be used to report Type-2 clones. The algorithm assumes that positions in source code are associated with the edges, which is just one possible embodiment of this disclosure.

In one embodiment of an algorithm: Find Type-2 clones: 1. Build the index. 2. Start in the root and traverse the index. When you come to a node that has no outgoing edge (which corresponds to the end of the tree): if the edge to this node is associated with more than one position in source code, report a clone. The index structure can be employed in syntactic search, which searches for a fragment of code based on its structural representation. Searching for a fragment of code is very straightforward: we linearize its structural representation and check whether the index structure contains the linearization. If the index structure contains the linearization, we report positions associated with the last edge or last node of the path from the root labeled by the linearization.

Although syntactic search is very precise, especially when we search for a pattern exactly (when no deviation from the pattern is allowed), the result does not have to fulfill our expectations. For example, when searching for pattern "if (x==0) y=1;", we may expect to find "if (x==0) {y=1;}" as well, but if these two patterns are linearized to different linearizations, the occurrences of the latter are not reported. Another example is an expression with superfluous parentheses. For example, when searching for "return x+y", we may also want to find "return (x+y)". In order to be able to report these syntactically equivalent trees, we may transform subject trees to a "normalized" form with a block instead of a single statement and with no parentheses. Some examples (not exhaustive) of possible normalization are as follows:

arithmetic expressions (e.g., "1+x" can be normalized to "x+1"), equality/inequality tests (e.g., "b==false" can be normalized to "!b" and "null !=p" can be normalized to "p !=null"), relational tests (e.g., ">p" can be normalized to "p<0"), assignments (e.g., "x+=1" can be normalized to "x++" and "y=y+2" can be normalized to "y+=2"), infinite loops (e.g., "while (true)" can be normalized to "for (;;)"), if statements (e.g., "if (!b) s1 else s2" can be normalized to "if (b) s2 else s1" and "if (b) return true; else return false;" can be normalized to "return b;"), conditional operators (e.g., "!b? e1:e2" can be normalized to "b? e2:e1").

When searching for a pattern, one may do the same transformation on the pattern tree. One possible use of the described system involves a software developer who works on the code base: during their work, such as when they write a new method, clones of that method are looked up and reported to the developer or used to recommend a library. Another possible use involves automated code completion: when the developer writes the beginning of a method, the method is looked up in the code base and automatically completed. Vet another possible use involves a search engine, which reports occurrences of code fragments in one or more code repositories. All these possible uses are presented only for illustrative purposes. They are not intended to be exhaustive and they do not limit possible embodiments of this disclosure.

Any of the components depicted in FIGS. 1A and 1B may be a module of computer-executable instructions, which are instructions executable on a computer, computing device, or the processors of a computer. The components are shown here as modules, but they may be embodied as hardware, software or any combination of hardware and software.

They are depicted here as residing on the computing device, but they may be distributed across many computing devices in a distributed system.

Figure 2:
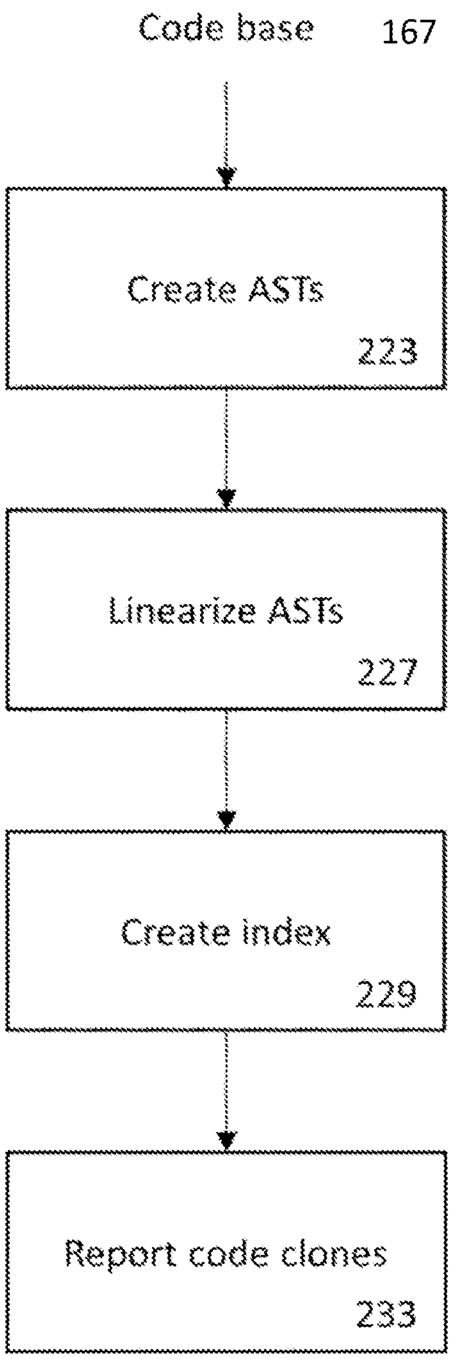
FIG. 2 is a flow chart of one embodiment of a computer-implemented method to identify source code clones.

FIG. 2 displays a flowchart of a possible embodiment of this disclosure. The embodiment uses the index structure based on ASTs to report code clones. The code base 167 is a collection of source code of programming projects. It is parsed to ASTs (step 223), the ASTs are linearized (step 227), the linearizations are used to build the index (step 229), and the index is used to report code clones (step 233).

Figure 3:
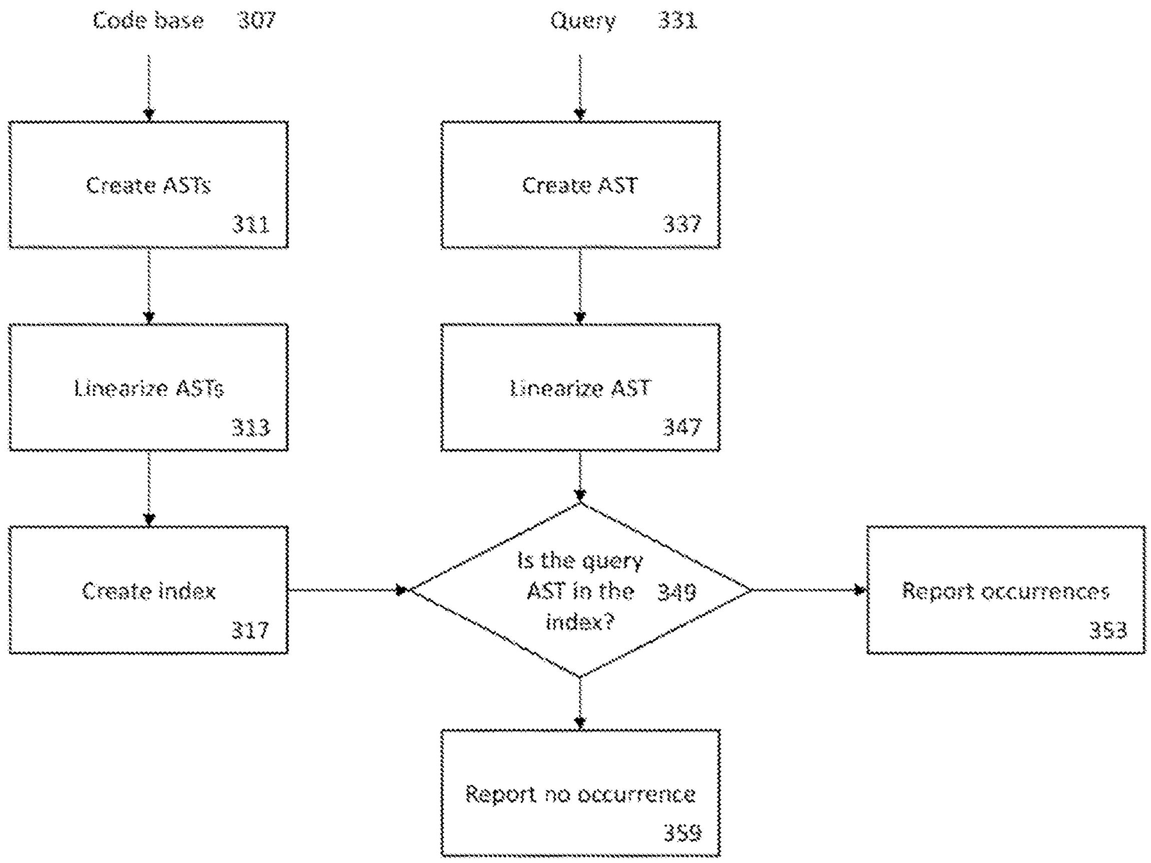
FIG. 3 is a flow chart of a method to identify similar code fragments that is an example embodiment of the disclosure

FIG. 3 displays another flowchart of a possible embodiment of this disclosure. The embodiment uses the index structure based on ASTs to search for a fragment of code. The code base 307 is a collection of source code of programming projects. It is parsed to ASTs (step 311), the ASTs are linearized (step 313), and the linearizations are used to build the index (step 317), which can be repeatedly used to answer the question of whether the code base contains a specified code fragment. To find a code fragment (query) 331 in the code base 307, the code fragment 331 is parsed to an AST (step 337), the AST is linearized (step 347) and the linearization is searched for in the index (step 349). If the index contains the linearization, the occurrences are reported (step 353), otherwise no occurrence is reported (step 359).

FIG. 4 illustrates one embodiment of the abstract syntax trees of expressions (x+2)/5 and x+y and one possible corresponding plain trie 400. The index structure consists of the trie 400 and the positions associated with edges 404 or with nodes 402 or with edges 404 and nodes 402.

Figure 5:
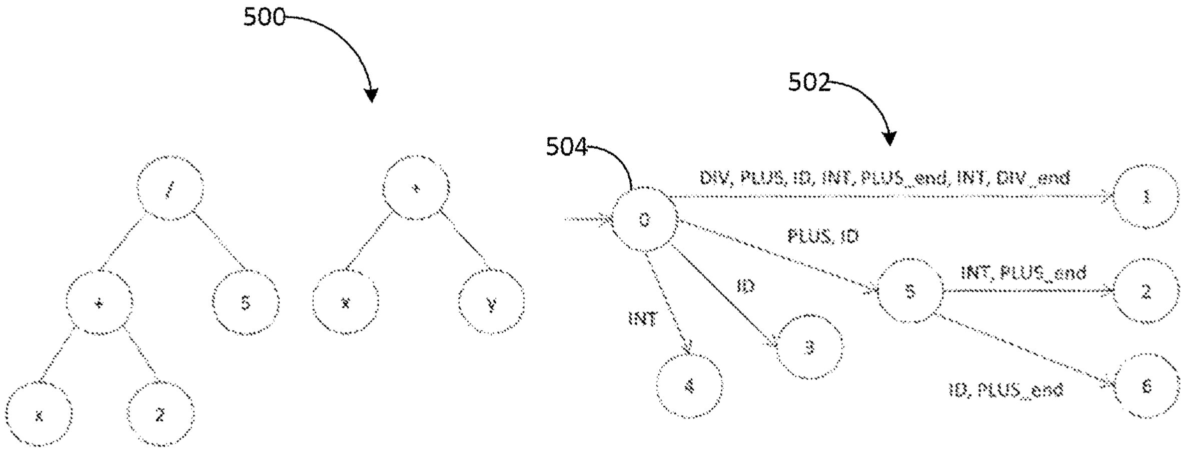
FIG. 5 shows the abstract syntax trees of expressions (x+2)/5 and x+y and one possible corresponding compressed trie.

FIG. 5 shows the abstract syntax trees of expressions (x+2)/5 and x+y and one possible corresponding compressed trie 500. The compressed index structure consists of the compressed trie 500 and the positions associated with edges 502 or with nodes 504 or with edges 502 and nodes 504.

As used herein, the term "non-transitory computer readable medium" is any physical device or storage media that physically hold data that form instructions that are executable by a computer device, one or more processors, or a computer platform. The instructions can be executed in sequence, in parts, or as objects. Examples of the physical devices are caches, registers, magnetic media, SSDs, hard drives, optical media, magnetic tape, punch cards, and other data storage devices.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A system for indexing source code, comprising:
- one or more processors that are configured to process the source code into an index structure through the steps of:
  - obtaining the source code; and
  - building the index structure by:
    - parsing the source code to generate one or more abstract syntax trees (ASTs);
    - linearizing subtrees of the ASTs, each subtree having:
      - one or more node representations, and
      - a special symbol at an end of each subtree having more than one of the node representations;
    - building a trie from the linearized subtrees, wherein the trie is comprised of a plurality of nodes and one or more edges; and
    - adding one or more positions of at least one of the one or more node representations or the special symbol of the subtrees within the source code to edges and nodes of the trie, the one or more positions associated with one or more edges, one or more of the plurality of nodes, or both one or more edges and one or more the plurality of nodes of the trie.

2. The system of claim 1, wherein the index structure comprises the trie.

3. The system of claim 1, wherein the index structure is compressed.

4. The system of claim 3, wherein the trie is compressed, and the index structure is based on the compressed trie.

5. The system of claim 1, wherein the one or more processers are further configured to perform the step of building the index structure by including one or more code bases.

6. The system of claim 5, wherein the one or more processers are further configured to perform the step of:
- detecting code clones in the one or more code bases; and
- identifying types of the code clones in the one or more code bases, the types of the code clones including an exact clone-type and a renamed clone-type.

7. The system of claim 5, wherein the one or more processers are further configured to perform the step of searching for a code fragment in the one or more code bases.

8. A non-transitory computer readable medium having instructions stored thereon that, when executed by a computing device, cause the computing device to index source code by performing operations comprising the steps of:
- obtaining the source code; and
- building an index structure by:
  - parsing the source code to generate one or more abstract syntax trees (ASTs);
  - linearizing subtrees of the ASTs, each subtree having:
    - one or more node representations, and
    - a special symbol at an end of each subtree having more than one of the node representations;
  - building a trie from the linearized subtrees, wherein the trie is comprised of a plurality of nodes and one or more edges; and
  - adding one or more positions of elements of the subtrees within the source code to edges and nodes of the trie, the one or more positions associated with one or more edges, one or more of the plurality of nodes, or both one or more edges and one or more the plurality of nodes of the trie.

9. The non-transitory computer readable medium of claim 8, wherein building the index structure comprises creating the index structure from the trie.

10. The non-transitory computer readable medium system of claim 8, wherein the instructions further cause the computing device to perform the step of compressing the index structure.

11. The non-transitory computer readable medium system of claim 10, wherein the instructions further cause the computing device to perform the step of compressing the trie, and building the index structure is based on the compressed trie.

12. The non-transitory computer readable medium system of claim 8, wherein the instructions further cause the computing device to perform the step of building the index structure by including one or more code bases.

13. The non-transitory computer readable medium system of claim 12, wherein the instructions further cause the computing device to perform the step of:

detecting code clones in the one or more code bases; and identifying types of the code clones in the one or more code bases, the types of the code clones including an exact clone-type and a renamed clone-type.

14. The non-transitory computer readable medium system of claim 12, wherein the instructions further cause the computing device to perform the step of searching for a code fragment in the one or more code bases.

15. A computer-implemented method for indexing source code, comprising:

obtaining the source code; and building an index structure by:

parsing the source code to generate one or more abstract syntax trees (ASTs);

linearizing subtrees of the ASTs, each subtree having:

one or more node representations, and a special symbol at an end of each subtree having more than one of the node representations;

building a trie from the linearized subtrees, wherein the trie is comprised of a plurality of nodes and one or more edges; and adding one or more positions of elements of the subtrees within the source code to edges and nodes of the trie, the one or more positions associated with one or more edges, one or more of the plurality of nodes, or both one or more edges and one or more the plurality of nodes of the trie.

16. The computer-implemented method of claim 15, wherein building the index structure comprises creating the index structure from the trie.

17. The computer-implemented method of claim 16, further comprising:

compressing the trie; and wherein building the index structure is based on the compressed trie.

18. The computer-implemented method of claim 15, further comprising building the index structure by including one or more code bases.

19. The computer-implemented method of claim 18, further comprising:

detecting code clones in the one or more code bases; and identifying types of the code clones in the one or more code bases, the types of the code clones including an exact clone-type and a renamed clone-type.

20. The computer-implemented method of claim 18, further comprising searching for a code fragment in the one or more code bases.

* * * * *